2,623,250

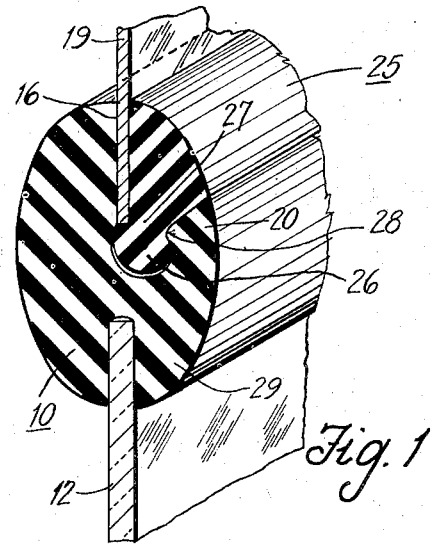
Fig. 1
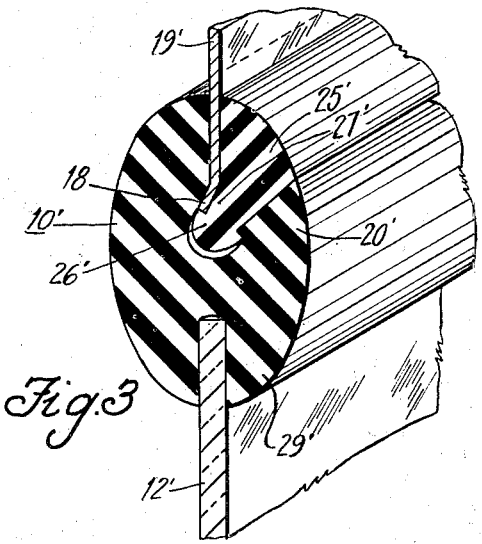
Fig. 3
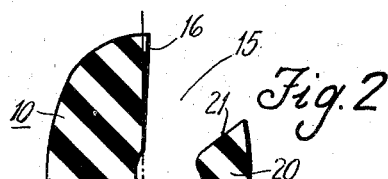
Fig. 2
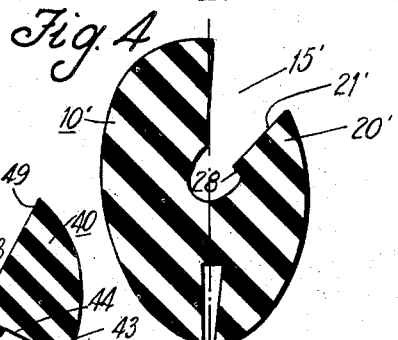
Fig. 4
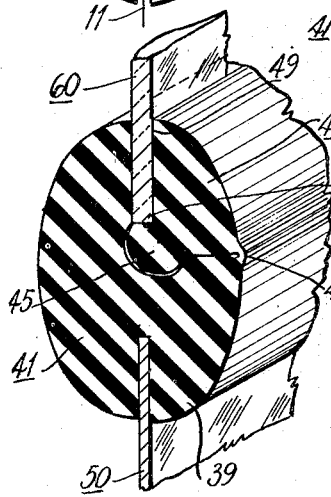
Fig. 5
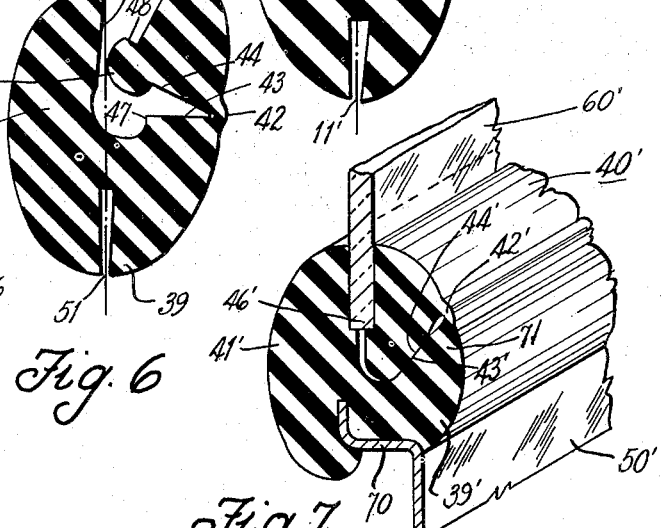
Fig. 6
Fig. 7
INVENTOR
RALPH H. CHILTON
By Willits, Hardman & Fehr
his ATTORNEYS Patented Dec. 30, 1952

UNITED STATES PATENT OFFICE 2,623,250

NONMETALLIC MOUNTING STRIP

Ralph H. Chilton, Dayton, Ohio, assignor to General Motors Corporation, Detroit, Mich., a corporation of Delaware Application December 29, 1950, Serial No. 203,500

2 Claims. (Cl. 20—56.4)

This invention relates to mounting strips of flexible elastic material, such as flexible rubber or rubber-like materials, especially adapted for mounting glass panes or other panels into openings therefor so as to provide a cushioning seal between the glass or panel and its connected support.

Various forms of mounting strips designed for this purpose are now known and used, examples being the disclosures in Eichner Patents #2,189,138 and 2,189,139, issued February 6, 1940.

An object of this invention is to provide mounting strips which can be very readily and efficiently assembled upon the connected parts as hereinafter described and thereafter provide a uniformly tight leak-proof seal between the connected parts.

Another object is to provide such a mounting strip comprising a main body strip and a wedging strip integrally attached thereto by a relatively thin flexible neck or hinge portion, the entire cross section being of such design that the strip can be made by extruding same thru a correspondingly shaped extrusion aperture.

Further objects and advantages of the present invention will be apparent from the following description, reference being had to the accompanying drawings wherein a preferred embodiment of the present invention is clearly shown.

In the drawing:

Fig. 1 illustrates a flexible rubber mounting strip fully assembled and connecting the marginal edges of a glass pane to the marginal edge of a sheet metal support such as a window opening in an automotive vehicle.

Fig. 2 shows a section of the main strip of Fig. 1 in its normal unstressed shape prior to assembling the panels and wedging strip thereupon.

Fig. 3 is similar to Fig. 1 but shows a modified form of installation wherein the marginal edge of the sheet metal support is bent at a slight angle for purposes hereinafter described.

Fig. 4 shows a cross section of the main strip of Fig. 3 in its normal unstressed shape prior to assembling the panels and wedging strip thereupon.

Fig. 5 shows a third form of mounting strip having an integral wedging strip, all fully assembled upon the connected panels.

Fig. 6 shows a cross section of the strip of Fig. 5 in its normal unstressed shape prior to assembling the connected panels thereupon.

Fig. 7 is similar to Fig. 5 but shows a modification of an integral type mounting strip.

Similar reference characters refer to similar parts throughout the several views.

Referring to Figs. 1 and 2, the main body strip 10, preferably of flexible rubber, may be extruded and then cured in continuous length in any well-known manner to have a normal unstressed cross section as shown in Fig. 2. The continuous groove 11 is designed to fit snugly upon the marginal edges of the glass pane 12 when said panel is inserted edgewise thereinto. The continuous materially larger groove 15 or cavity (as it will hereinafter be termed to clearly distinguish it from groove 11) has one outlining surface 16 thereof in substantially opposed position to groove 11. The continuous angular projection 20 is sufficiently distortable as to be readily flexed to the right (as viewed in Fig. 2) in order to permit the marginal edge of the sheet metal panel 19 to be passed directly laterally thereover to lie against surface 16 approximately as shown in Fig. 1.

Now to mount a glass pane 12 into a suitably larger window opening in the metal panel 19, the flexible main body strip 10 is first applied around the periphery of glass pane 12 by inserting the margin of pane 12 snugly into groove 11. Then this unit of glass pane 12 and body strip 10 is placed laterally against the window opening in panel 19, and by flexing the angular projection 20 outwardly sufficiently to clear the necessary one or more of the edges of panel 19 the unit of pane 12 and body strip 10 can be moved laterally into said opening until the margins of panel 19 lie in contact with the surface 16 of cavity 15 that is, in approximately the positions shown in Fig. 1. Thereupon the wedging strip 25 is forced into its position shown in Fig. 1 between the edge of panel 19 and the inclined surface 21 of projection 20. The inner portion of wedging strip 25 has an enlargement 26 which is forced past the smaller neck opening 27 between the inner edge of panel 19 and the hump 28 on main strip 10. This serves to retain wedging strip 25 locked in assembled position. When thus assembled wedging strip 25 is pressed tightly against panel 19 and of course panel 19 is correspondingly forced into tight contact with surface 16, thus sealing both sides of panel 19. The reaction of wedging strip 25 being squeezed against surface 21 of projection 20 compresses the adjacent deformable material of body strip 10 and hence causes lip 29 thereof to be held more tightly against the glass pane 12, thus providing a better seal on both sides of said glass panel.

The form of the invention shown in Figs. 3 and 4 is made and assembled in substantially the same way as above described in connection with Figs. 1 and 2, the similar parts being designated by prime reference numerals. In this form the inner peripheral edge of the supporting sheet metal panel 19' is bent to provide an angular flange 18. This flange 18 is turned at such an angle as to provide a smooth surface over which the enlargement 26' on wedging strip 25' is more easily forced during insertion of said wedging strip. Also in this form of Figs. 3 and 4, the surface 21' of main body strip 10' has an abrupt shoulder 28' which interlocks with a corresponding shoulder on wedging strip 25' to retain said wedging strip in assembled position.

The form of the invention shown in Figs. 5 and 6 is similar in many respects to the forms hereinabove described. The wedging strip 40 and main body strip 41 are integrally connected by a relatively thin and flexible continuous hinge portion 42. This integral strip may be extruded thru an extrusion die with the wedging strip 40 suitably separated from main body 41 except at the connecting hinge portion 42, for example in the position shown in Fig. 6, and cured in that position so that Fig. 6 represents the normal or unstressed shape of the cured strip. However the hinge portion 42 is sufficiently flexible to permit the wedging strip 40 to be readily swung clockwise (as viewed in Fig. 6) thru approximately 180 degrees (if necessary) for assembling purposes.

In assembling this strip upon the connected panels the mounting strip is applied around the edges of the window opening in metal panel 50 by first inserting said edges edgewise snugly into grooves 51. Then the glass pane 60 is moved into position at the window opening and the wedging strip portions 40 are swung outwardly about the hinges 42 sufficiently to permit the glass pane 60 to pass laterally thereover and into contact with the surface 61, that is, approximately into the position shown in Fig. 5. Thereafter the wedging strip portions 40 are swung counterclockwise into contact with the glass pane 60 and forced into final position shown in Fig. 5 by squeezing the enlargement 45 thereon thru the suitably narrower neck opening defined by the inner edge 46 of the glass pane 60 and the shoulder 47 on main body 41. After wedging portion 40 is forced to its final position it is retained in place by its shoulder 48 locking under the inner edge of glass pane 60. The glass engaging surface 49 of wedging portion 40 is pressed tightly against glass pane 60 and thus seals both sides of said pane. The reaction of wedging portion 40 on main body 41 compresses the adjacent deformable material thereof and hence causes wing 39 of said main body to be forced more tightly against the metal panel 50 to provide a tighter seal on both sides of panel 50. Lateral force against glass pane 60 to the right (as viewed in Fig. 5) is strongly resisted by the shoulder 47 on main body 41, as will be obvious from Fig. 5. If so desired, the dividing line between main body 41 and wedging portion 40 (represented by surfaces 43 and 44 in Fig. 6) may be inclined upwardly at say from 30 to 45 degrees and yet permit the lateral passage of pane 60 into position as above described.

The form of the invention shown in Fig. 7 is similar to that of Fig. 5 and is made and assembled upon the connected parts in a similar manner. The similar parts are designated by prime reference numerals. In this form the supporting metal panel has a laterally extending flange 70 against which the wing portion 39' is directly compressed when the wedging portion 40' is forced into its final position shown in Fig. 7. Thus the angular upwardly extending wing 71 is more firmly backed up by flange 70 when the wedging portion 40' is squeezed into its final position. The inclination of the surface 44' on wedging portion 40' and its complementary surface 43' on main body 41' against which it presses is such that wedging portion 40' will be retained in final position by the pressure engagement between said surfaces 43' and 44'. Lateral force against glass pane 60' to the right (as viewed in Fig. 7) will increase the pressure of surface 44' on surface 43' and in view of the inclination of these surfaces will obviously have no tendency to swing wedging strip 40' clockwise out of its final position. This lateral force against glass pane 60' is resisted by the wing portion 71 which is in turn firmly backed up by flange 70 as stated above. In this form of the invention the resilient deformable material of the mounting strip may be materially harder and hence stronger than is customary with mounting strips used for similar purposes since less distortion thereof is required in order to assemble the strip upon the two joined panels.

All forms of the invention are shown in the drawings on an enlarged scale beyond such strip sections ordinarily used in mounting glass panes in automotive vehicles or the like. In the forms shown in Figs. 1, 3 and 5 the positions of the glass pane and the sheet metal panel can of course be reversed relative to the wedging strips if so desired.

While the embodiment of the present invention as herein disclosed, constitutes a preferred form, it is to be understood that other forms might be adopted.

What is claimed is as follows:

1. In combination, a cushioning mounting strip formed of resilient deformable material for joining adjacent margins of two panels, comprising: a main body strip having a continuous longitudinal groove therein for relatively snugly receiving the margin of one of said panels, said main body strip having therein in opposed relation to said groove a continuous longitudinal cavity, a wedging strip of resiliently deformable material integrally connected to the main strip by a relatively thin hinging neck which is sufficiently flexible to permit the wedging strip to be moved to a position where it will not interfere with movement of the other of said panels laterally into said cavity to a position in opposed relation to said first panel, said wedging strip being movable into position to exert a pressure on said other panel when the latter is positioned in the cavity and of such a size as to substantially fill said cavity when in such position and having a deformable enlargement adjacent its inner edge adapted to interlock with said main strip and said panel to retain the wedging strip in position.

2. In combination, a cushioning mounting strip formed of resilient deformable material for joining adjacent margins of two panels, comprising: a main body strip having a continuous longitudinal groove therein for relatively snugly receiving the margin of one of said panels, said main body having a continuous longitudinal cavity in opposed relation to said groove of such dimensions that the margin of the other of said panels may be passed laterally into position therein into substantial alignment with said first panel after said first panel is assembled within said groove, and a wedging strip insertable under pressure into said cavity in contact with said second panel after said second panel is located therein, said wedging strip being integrally joined to said main body by a continuous flexible hinged portion about which said wedging strip is freely swingable.

RALPH H. CHILTON.

REFERENCES CITED

The following references are of record in the file of this patent:

UNITED STATES PATENTS

| Number | Name | Date |
|---|---|---|
| 2,189,138 | Eichner | Feb. 6, 1940 |
| 2,205,538 | Owen | June 25, 1940 |
| 2,288,329 | Smith | June 30, 1942 |
| 2,492,566 | Geyer | Dec. 27, 1949 |
| 2,505,893 | Haas | May 2, 1950 |